United States Patent
Bahk et al.

(10) Patent No.: US 8,254,324 B2
(45) Date of Patent: Aug. 28, 2012

(54) SCHEDULING METHOD FOR WIRELESS COMMUNICATION SYSTEM

(75) Inventors: Saewoong Bahk, Seoul (KR); Sungguk Yoon, Seongnam-si (KR); Younghan Kim, Seoul (KR)

(73) Assignee: Snu R&DB Foundation, Seoul (KR)

( * ) Notice: Subject to any disclaimer, the term of this patent is extended or adjusted under 35 U.S.C. 154(b) by 295 days.

(21) Appl. No.: 12/691,602

(22) Filed: Jan. 21, 2010

(65) Prior Publication Data

US 2010/0189065 A1   Jul. 29, 2010

(30) Foreign Application Priority Data

Jan. 23, 2009  (KR) ........................ 10-2009-0006255

(51) Int. Cl.
*H04W 4/00* (2009.01)
*H04W 72/00* (2009.01)

(52) U.S. Cl. ........................ 370/329; 370/431

(58) Field of Classification Search ................ None
See application file for complete search history.

(56) References Cited

U.S. PATENT DOCUMENTS

| | | | | |
|---|---|---|---|---|
| 2002/0177447 A1* | 11/2002 | Walton et al. | ................. | 455/452 |
| 2003/0087673 A1* | 5/2003 | Walton et al. | ................. | 455/562 |
| 2003/0125040 A1* | 7/2003 | Walton et al. | ................. | 455/454 |
| 2003/0128658 A1* | 7/2003 | Walton et al. | ................. | 370/208 |
| 2007/0177555 A1* | 8/2007 | Brueck et al. | ................. | 370/338 |
| 2007/0286124 A1* | 12/2007 | Grant et al. | ................. | 370/331 |
| 2008/0214198 A1* | 9/2008 | Chen et al. | ................. | 455/450 |
| 2008/0242332 A1* | 10/2008 | Suh et al. | ................. | 455/517 |
| 2009/0040928 A1* | 2/2009 | Wang et al. | ................. | 370/232 |
| 2009/0279445 A1* | 11/2009 | Nogami et al. | ................. | 370/252 |
| 2009/0296595 A1* | 12/2009 | Khoshnevis et al. | ......... | 370/252 |
| 2010/0054191 A1* | 3/2010 | Higuchi et al. | ............... | 370/329 |
| 2010/0323739 A1* | 12/2010 | Wan et al. | ..................... | 455/513 |

* cited by examiner

*Primary Examiner* — Steven H Nguyen
(74) *Attorney, Agent, or Firm* — Sherr & Vaughn, PLLC

(57) ABSTRACT

A scheduling method for a wireless communication system is disclosed. The method includes (a) selecting n(<N) terminals among the N terminals included in the wireless communication system; (b) receiving channel state information from the selected terminals and allocating wireless resources to at least one terminal among the selected terminals; (c) performing transmission or reception via the allocated wireless resource at the at least one terminal; and (d) newly selecting n terminals and returning to the (b) step, wherein the remaining terminals except for the selected terminals inactivate the transmitting and receiving function at the steps of (b) and (c). Therefore, a wireless cellular network adapted to improve the energy efficiency in fairness is provided.

7 Claims, 12 Drawing Sheets

FIG. 8

RESULTS OF A SYMMETRIC NETWORK (SIMULATION RESULT / NUMERICAL RESULT)

| Scheduling | Cell Throughput (bits/slot) | Network Lifetime (slots) | Total Transferred Traffic (kbits) |
|---|---|---|---|
| MAX. PF | 5.6844 / 5.6552 | 1248 / 1246.9 | 7.0940 / 7.0515 |
| RR | 2.9301 / 2.9062 | 9171 / 9174.3 | 26.872 / 26.662 |
| EPF | 3.8889 / 4.0191 | 8163 / 7692.3 | 31.745 / 30.916 |

SCHEDULING METHOD FOR WIRELESS COMMUNICATION SYSTEM

CROSS REFERENCE TO PRIOR APPLICATION

The present application claims priority under 35 U.S.C. 119 and 35 U.S.C. 365 to Korean Patent Application No. 10-2009-0006255 (filed on Jan. 23, 2009), which is hereby incorporated by reference in its entirety.

This research is supported by the ubiquitous Computing and Network (UCN) Project, the Ministry of Knowledge and Economy (MKE) Knowledge and Economy Frontier R&D Program in Korea as a result of UCN's subproject 10C2-C1-10M.

TECHNICAL FIELD

The described technology relates generally to a scheduling for a wireless communication system and, more particularly but not exclusively, to a scheduling method for a wireless cellular network designed to improve the energy efficiency in fairness.

BACKGROUND

In a communication system, energy saving technique directly affects the network lifetime and is gaining importance according to the ubiquitous communication environment, multimedia service environment, and the trend of recent technology such as the small hand-hold wireless devices.

Typical examples of the currently proposed energy saving techniques are technique of powering off the transceiver (e.g. RF module) when no data to transmit or receive exists and technique of allocating minimum power (e.g. adaptive modulation and coding) under constraint conditions (e.g. error rate, transmission rate, transmission delay).

In the former technique, energy is saved by periodically generating or controlling the sleeping period during which the power is saved by turning off the transceiver and the active period during which transmission and/or reception for wireless communication is performed.

In the latter technique, the transmission efficiency may be increased through the adaptation to the channel state. Particularly, the opportunistic scheduling technique, a scheduling technique obtained by extending the latter technique to the multiuser environment may increase the transmission efficiency according to the benefit of the multiuser diversity. However, the opportunistic scheduling technique requires the channel state information feedback from all users. This causes additional consumptions of energy and wireless resources for the information feedback. Particularly, more information feedbacks are required in the MIMO environment or multi-carrier (e.g. OFDM) environment so that the additional consumptions are increased. In order to overcome the above drawback, a partial information feedback technique (i.e. reporting only the information regarding the partial subchannel having an excellent channel state or reporting only if the channel state is excellent) is proposed. The partial information feedback technique focuses on minimizing the additional consumption of the wireless resources by minimizing the information amount of the feedback. However, the partial information feedback rarely considers the energy consumption. To report the channel state information, energy is consumed by the operation of obtaining the channel state information (e.g. operation of receiving pilot signals, preambles, etc. and estimating channel quality based on the received signal) and the operation of transmitting the channel state information. Particularly, in conventional techniques, the energy consumption for the former operation is not considered at all.

As a result, a scheduling technique for a wireless cellular network improved in energy efficiency is required and, more preferably, a scheduling technique, which provides the opportunity to all users in a fair manner, is required.

SUMMARY

In accordance with some embodiments, a scheduling method in which a scheduler of a wireless communication system schedules $N(>1)$ terminals, includes the steps of: (a) selecting $n(<N)$ terminals among the N terminals; (b) receiving channel state information from the selected terminals and allocating wireless resources to at least one terminal among the selected terminals; (c) performing transmission or reception via the allocated wireless resource at the at least one terminal; and (d) newly selecting n terminals and returning to the (b) step.

In one embodiment, the remaining terminals except for the selected terminals inactivate the transmitting and receiving function at the steps of (b) and (c).

In another embodiment, the selected terminals inactivate the transmitting and receiving function for the rest of time period except for the period of obtaining and transmitting the channel state information and the period corresponding to the wireless resources.

In another embodiment, the n is a natural number selected to maximize the communication system efficiency in relation to energy consumed by the terminals.

In another embodiment, the (b) step includes comprises allocating the wireless resource to a terminal having the highest transmission rate predicted by the mean transmission rate-to-the current channel state.

In another embodiment, the scheduler is placed at a base station belonging to the wireless communication system.

In accordance with some embodiments, a scheduling method in which a scheduler of a wireless communication system schedules terminals, includes the steps of: (a) generating a first to $M(>1)$ group by grouping the terminals and determining a controlling period for each group; (b) selecting one of the groups; (c) receiving channel state information from at least part among the terminals included in the selected group during a controlling period of the selected group and allocating wireless resources to at least one of the at least part; and (d) selecting a group different from the previously selected group and returning to the (c) step.

In one embodiment, the terminals of the remaining groups except for the selected group inactivate the transmitting and receiving function during the controlling period of the (c) step.

In another embodiment, the (a) step includes determining a number of non-sleeping terminals reporting the channel state information $n_m$ (a natural number smaller than $N_m$ where m, a group index, is a natural number between 1 and M, and $N_m$ is a number of group elements of the related group) for each group and the (c) step includes the steps of: (c1) selecting $n_m$ terminals among the terminals of the selected group; (c2) receiving the channel state information from the selected terminals and allocating wireless resources to the at least one terminal among the selected terminals; and (c3) implementing the transmission or receiving by the relevant terminal via the allocated wireless resource, wherein the remaining terminals except for the selected terminals inactivate the transmitting and receiving function at the steps of (c2) and (c3).

In another embodiment, the (c) step further includes the step of (c4) newly selecting $n_m$ terminals and returning to the (c2) step.

In another embodiment, the $n_m$ is a natural number selected to maximize the communication system efficiency of the relevant group in relation to energy consumed by the terminals of the relevant group.

In another embodiment, the (a) step includes including, into the identical groups, the terminals similar in statistical feature of the channel state.

In another embodiment, the (a) step includes determining the controlling period for each group in proportional to the number of group elements.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those of ordinary skill in the art by describing in detail example embodiments thereof with reference to the attached drawings in which:

FIG. 8 illustrates a table comparing performance of the scheduling method of the present disclosure and performance of the conventional method in a symmetric network.

DETAILED DESCRIPTION

Figure 1:
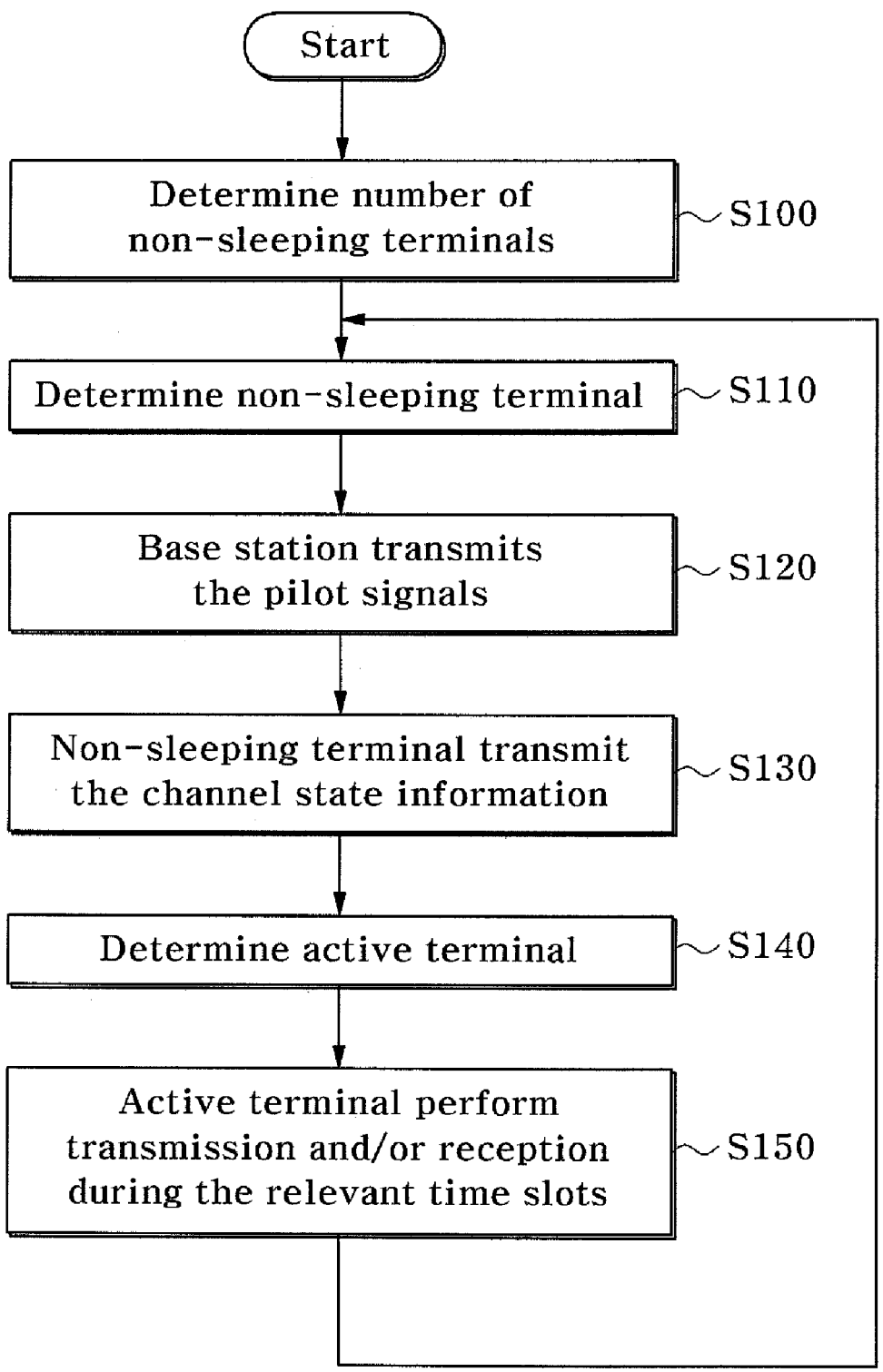
FIG. 1 is a flow chart illustrating a scheduling method in one embodiment.

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms used therein including technical or scientific terms have meanings understood by those skilled in the art. Terms generally defined in dictionaries should be construed as having a meaning on a context of related schemes, and not as having an abnormally or inordinately formal meaning, unless clearly defined.

A scheduling method for a wireless cellular network effective in energy with fairness is provided.

A scheduling method according to one embodiment classifies and controls terminals into sleeping terminal, idle terminal, and active terminal by considering energy consumed for obtaining the channel state information (e.g. calculating received signal-to-noise ratio by sensing the channel) and transmitting the channel state information. The sleeping terminal inactivates the transmitting and receiving function during a predetermined time period. The idle terminal inactivates the transmitting and receiving function during the remaining time period except for the time period used for the reporting operation (acquiring and transmitting the channel state information) among the predetermined time period. The active terminal inactivates the transmitting and receiving function during the remaining time period except for the reporting operation period and the time period corresponding to the allocated wireless resource. Inactivating the transmitting and receiving function implies less energy consumption (i.e. off state of the RF module) compared to the energy consumed for the transmitting and receiving operation. The terminal used to report the channel state information (i.e., idle terminal and active terminal) is called a non-sleeping terminal.

The opportunistic scheduling controlling three types of terminals classified in terms of energy consumption according to one embodiment may raise the transmission efficiency with respect to energy by optimizing the number of non-sleeping terminals and may provide fairness.

The present disclosure is assumed to be applied to a wireless cellular network comprising a base station having a scheduler, and N terminals. However, it may be understood by those skilled in this art that this disclosure is not limited hereto and may be applied to a various wireless communication systems.

The present disclosure is assumed to be applied to a communication system in which a wireless resource, time slot is allocated to a selected terminal. However, it may be understood by those skilled in this art that this disclosure is not limited hereto and may be also applied into a various communication system such as an OFDMA communication system allocating the wireless resource to various terminals simultaneously.

The present disclosure is assumed to include the received SNR into the channel state information. However, it is understood by those skilled in this art that various measured values such as the received SNR, received signal strength (RSS), bit error rate (BER) etc. can be used as the channel state information.

The present disclosure includes a frame structure in which a signal for estimating channel state of each time slot and the channel state information are transmitted prior to the each time slot. However, it may be understood by those skilled in this art that this disclosure is not limited thereto and may be applied into various frame structures.

The switching between the sleeping mode and the non-sleeping mode for each terminal may be performed by a promised method between the terminals and the scheduler. The scheduler may also control the switching by using the separate control channels. The switching between the idle mode and the active mode for each terminal is embodied by the scheduler controlling via the separate control channels. The above methods may be sufficiently understood by those skilled in this art so that the detailed description thereof is omitted in this paper.

The present disclosure is assumed to update the non-sleeping terminals per each time slot. However, it is understood by those skilled in this art that the updating time or period may be variously embodied.

Embodiments of the present disclosure are named as EPF (Energy based Proportional Fair), EPF-A (Averaging), and EPF-G (Grouping) for convenience. EPF is effective to a symmetric network in which all of the terminals have the identical statistical feature (e.g. average received SNR) of the channel state. EPF-A and EPF-G, are effective to asymmetric network in which terminals having different statistical features of the channel state exist.

As the EPF-G is a group-based scheduling method different from other techniques, EPF and EPF-A will be described first.

FIG. 1 is a flow chart illustrating a scheduling method in one embodiment and, more particularly, a scheduling method according to EPF and EPF-A.

In the step of S100, the scheduler of a base station determines the number n of non-sleeping terminals. EPF and EPF-A are different only in method for determining the number n of the non-sleeping terminals and the determining methods will be described later in this paper.

In the step of S110, by the scheduler of the base station, n non-sleeping terminals are determined. The remaining N-n terminals are automatically determined as sleeping terminals. For example, the n non-sleeping terminals may be determined, but is not limited hereto, by randomly selecting the n terminals among N terminals or using the round robin method. According to the former method, it may be required that the randomly selected result is signaled from the scheduler to the relevant terminal per loop. According to the latter method, the relevant signaling may be minimized.

In the step of S120, the base station transmits a signal (e.g. a pilot signal) required to obtain the channel state information at the terminals.

In the step of S130, each non-sleeping terminals estimates the received SNR based on the received pilot signals and transmits the channel state information including the estimated value. The sleeping terminals may inactivate the transmitting and receiving function for energy saving.

In the step of S140, the base station determines the active terminals (i.e. terminals to which the time slots for the transmission or receiving are to be allocated) based on the channel state information received from the non-sleeping terminals. For example, in order to determine the active terminals, a method of determining non-sleeping terminals having the most excellent channel state as the active terminals among the non-sleeping terminals and a method of determining, as the active terminals, non-sleeping terminals having the most excellent transmission rate for the average transmission rate-to-transmission rate presumed as the current channel state like the proportional fair algorithm.

In the step of S150, the active terminals activate the transmitting function and/or the receiving function during the allocated time slot.

After a certain time period is passed for the related time slot, the procedure is returned to the step of S110 and thereby n non-sleeping terminals are newly selected to operate S120 to S150 regarding the new time slots.

Figure 2:
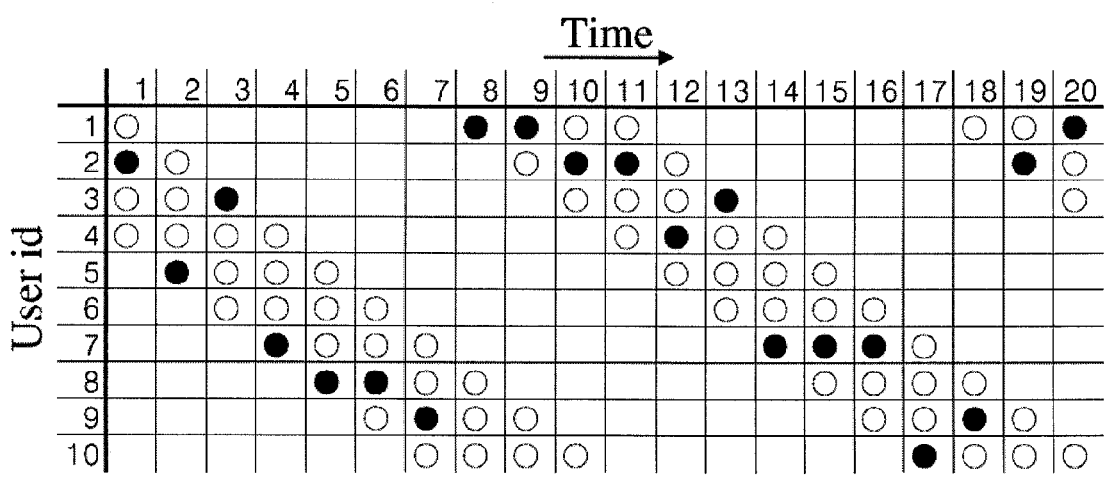
FIG. 2 is illustrated to depict one embodiment of FIG. 1.

FIG. 2 is illustrated to depict one embodiment of FIG. 1.

Referring to FIG. 2, terminal ID (i.e., an user ID) is depicted on the vertical axis while a time slot index is depicted on the horizontal axis. The unit handling time of the scheduler may comprise the time of transmitting the pilot signal, the time of transmitting the channel state information, and the time slot. For convenience, only the time slot is illustrated in FIG. 2, and that is because it is sufficient if the pilot signal and the channel state information are transmitted prior to the usage (or allocation) of the related time slot.

In FIG. 2, the terminal indicated as a circle is a non-sleeping terminal, the terminal indicated not as a circle is a sleeping terminal, the terminal indicated as a black circle is an active terminal, and a terminal indicated as a white circle is an idle terminal. The terminal indicated as a circle in a time slot activates the receiving function to obtain the channel state information prior to the usage of the time slot (i.e. before or at the starting point in the time slot) and activates the transmitting function to transmit the channel state information. The terminal indicated as the black circle activates the transmitting and/or receiving function to transmit and/or receive a wireless signal even during the time slot. The terminals indicated not as circles inactivate the transmitting and receiving function at least during the time period related to the relevant time slot (including the time of acquiring or transmitting the channel state information, the relevant time slot period).

With reference to FIG. 1, FIG. 2 will be described now. The terminal number N in the cell is 10, and the non-sleeping terminal number n is determined to be 4 according to the statistical feature of the channel state regarding the terminals (S100). Next, the first to fourth terminals (User ID 1, 2, 3, 4) at the starting point of the first time slot is selected as the non-sleeping terminal (first loop at the step of S110), and the pilot signal is transmitted at the starting point of the first time slot (first loop at the step of S120). The non-sleeping terminals transmit, to the base station, the channel state information acquired based on the received pilot signals (first loop at the step of S130). The base station determines the second terminal (User ID 2) as the active terminal based on the received channel state information (first loop at the step of S140). As a result, the active terminal activates the transmitting function (if the time slot for the transmission is allocated) during the allocated first time slot and/or the receiving function (if the time slot for the receiving is allocated) and performs the transmitting and/or receiving operations according to the first time slot (first loop at the step of S150). Then, the second to fifth terminals (User ID 2, 3, 4, 5) are newly selected as the non-sleeping terminals (second loop at the step of), and the procedure for the second time slot is executed as the same way of the above-explained procedure for the first time slot.

In FIG. 2, the non-sleeping terminals are determined via the round robin method. However, the above determining method is not limited hereto and it is understood by those skilled in this art that the method may be determined in various manners, for example determining the method randomly etc. Both the round robin method and randomly determining method are effective as those methods maintain the fairness. Particularly, the round robin method, which decreases up to one for the number of terminal switching between the non-sleeping mode and the sleeping mode as shown in FIG. 2 is effective in minimizing the time and energy consumption for the mode switching.

The n determining method according to EPF and the n determining method according to EPF-A will be described now.

The total energy e(n) consumed in the unit handling time (i.e. time including the transmission of the pilot signal, the transmission of the channel state information, and transmission and/or reception via the allocated time slot) of the scheduler may be expressed in formula 1.

$$e(n) = \alpha + \beta(n-1) + \gamma(N-n) \quad \text{[FORMULA 1]}$$

where $\alpha$, $\beta$, and $\gamma$ respectively denotes energy consumed by the active terminal, the idle terminal, and the sleeping terminal and have a relationship of $\alpha > \beta > \gamma$ according to the aforementioned feature.

If the random variable of the received SNR for each terminal has a Rayleigh fading channel characteristics and has stationary ergodic independent identical distribution as the symmetric network, the joint probability distribution for the received SNR of the n terminals may be expressed in formula 2.

$$P(Z_1, Z_2, \ldots, Z_k, \ldots, Z_n \leq z) = P(Z_1 \leq z)^n = (1 - \exp[-z/z_0])^n \quad \text{[FORMULA 2]}$$

where $Z_k$ is a random variable regarding the SNR of the k-th (k=1, 2, ..., n) terminal, and $z_0$ is the mean SNR of all the terminals according to the identical distribution condition.

The probability distribution $G_k(s)$ regarding the transmission efficiency of the k-th terminal may be expressed in formula 3 by using the probability distribution feature of bandwidth W, Shannon capacity W log(1+z) according to the received SNR value z, and the probability distribution feature of the aforesaid $Z_k$.

$$G_k(s) = P\{W \log(1 + Z_k) \leq s\} \quad \text{[FORMULA 3]}$$
$$= 1 - \exp\left[-\frac{1}{z_0}(e^{s/W} - 1)\right]$$

the joint probability distribution $G^n(s)$ regarding the transmission efficiency of the n non-sleeping terminals may be expressed in formula 4 by using the identical distribution condition of the aforementioned $Z_k$.

$$G^n(s)\left(1 - \exp\left[-\frac{1}{z_0}(e^{s/W} - 1)\right]\right)^n \quad \text{[FORMULA 4]}$$

Using formula 4, communication system efficiency (i.e. cell throughput) r(n) may be expressed in formula 5. In the present disclosure, the communication system efficiency denotes the transmittable information amount per wireless resource in the communication system (or cell).

$$r(n) = \int_0^\infty (1 - G^n(s))ds \quad \text{[FORMULA 5]}$$

The n determining method according to EPF is determined by the value having r(n) of formula 5 as the maximum value for the e(n) of the formula 1.

$$(P) \max_n U(n) := \frac{r(n)}{e(n)} \quad \text{subject to } 1 \leq n \leq N$$

The optimal solution n* for (P) may be obtained through the method of relaxing the integer constraint of n to the real number constraint or the method using other experimental values. The former method may be described in one embodiment as follows.

In the optimization problem (P), if n integer constraint of n is relaxed and is substituted by the constraint of real number x, U(n) becomes a utility function of the continuous version, $$U_c(x) := \frac{r(x)}{e(x)}$$

where x is real number. If x value, $x_o$, which induces the differential value of $U_c(x)$ to be 0, is in the rage of [1, N], n* is a minimum natural number greater than or equal to $x_o$, or a maximum natural number less than or equal to $x_o$. If $x_o$ is not in the range of [1, N], n* becomes the number close to $x_o$ between 1 and N.

Figure 3:
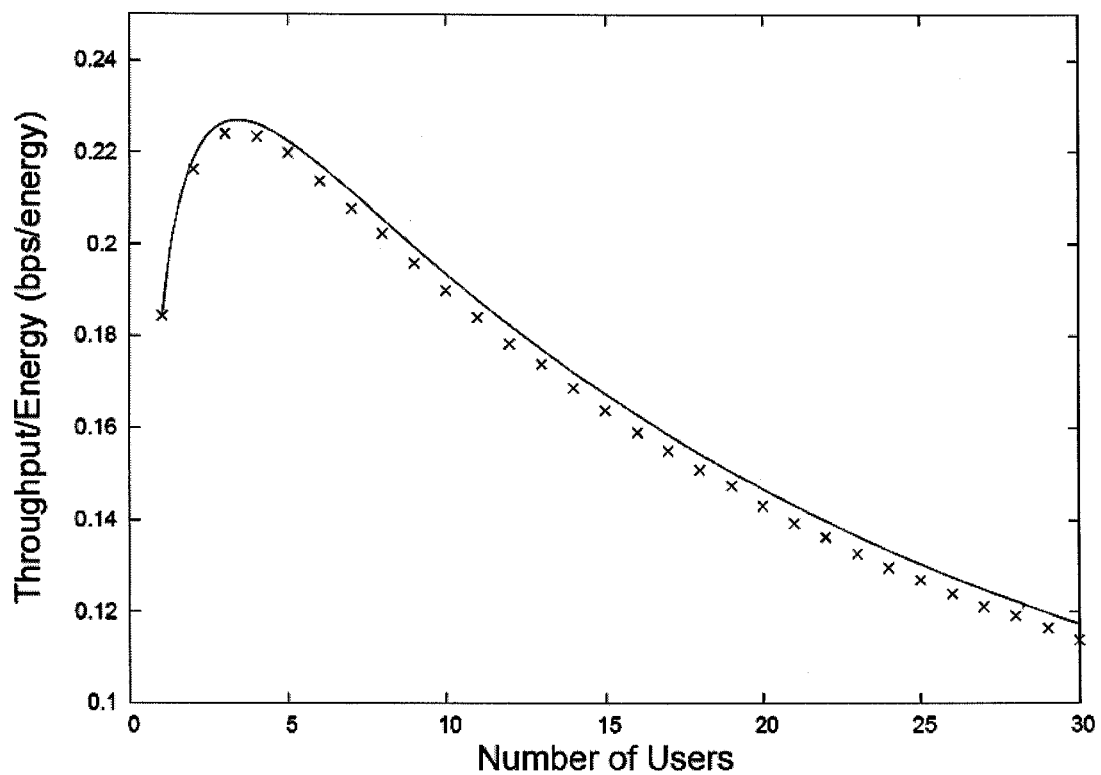
FIG. 3 illustrates a energy-to-transmission efficiency curve regarding the number of non-sleeping terminals in a symmetric network.

FIG. 3 illustrates a energy-to-transmission efficiency curve regarding the number of non-sleeping terminals in a symmetric network. Particularly, FIG. 3 illustrates $U_c(x)$ when the number of terminals in the cell is 100 and all of the terminals have the average received SNR $z_0 = 10$ dB. In FIG. 3, the solid line represents the result of the numerical analysis through MATLAB, and "+" symbol represents the simulation results.

Referring to FIG. 3, as $x_o$ is 3.4, the optimal solution n* is determined to be 3.

The curve in FIG. 3 can be explained as follows. As the number of terminals reporting the channel state increase, the transmission efficiency increases in log scale according to the benefit of the multiuser diversity. However, the total energy consumed to report the channel state increases linearly. Therefore, as the number of non-sleeping terminals increases, the transmission efficiency monotonically increases and then monotonically decreases at the peak point.

Hereinafter, a method of determining n used for EPF-A and EPF-G effective at an asymmetric network will be described now.

If the optimization problem (P) is extended to an asymmetric network (, i.e. the environment where the average SNR of all terminals is not identical) maintaining fairness, the solution of the optimization problem ($\bar{P}$) may be obtained as follows:

$$(\bar{P}) \max_{\bar{l}(t)} \sum_t \bar{U}(t) = \sum_t \frac{\bar{r}(t)}{\bar{e}(t)}$$

$$\text{subject to } \sum_t I_1(t) = \sum_t I_2(t) = \ldots = \sum_t I_N(t)$$

-continued where $\bar{r}(t) = \int_0^\infty \left(1 - \prod_{k=1}^{N} I_k(t)G_k(s)\right) ds,$ $G_k(s) = 1 - \exp[-(e^{s/W} - 1)/z_k],$ $\bar{e}(t) = \alpha + \beta\left(\sum_i I_i(t) - 1\right) + \gamma\left(N - \sum_i I_i(t)\right)$ $I_k(t)$ is an indicator function informing whether $k^{th}$ terminal is in a non-sleeping mode in a time slot t. When the terminal is in a non-sleeping mode, the value becomes 1 and, if not, becomes 0. $\vec{I}(t)$ is a vector consisted of the indicator functions of each terminal. $z_k$ represents the average received SNR of the $k^{th}$ terminal.

In order to obtain the solution of the optimization problem (P), an n determining method according to EPF-A may be used by substituting $$\frac{1}{N}\sum_k z_k,$$

the average in relation to the average SNR of all terminals into $z_0$ of the formula 4. Then, the n is determined by using the identical manner to that of EPF (i.e. a method of obtaining the solution of the optimization problem (P) using the formula 5).

Figure 4:
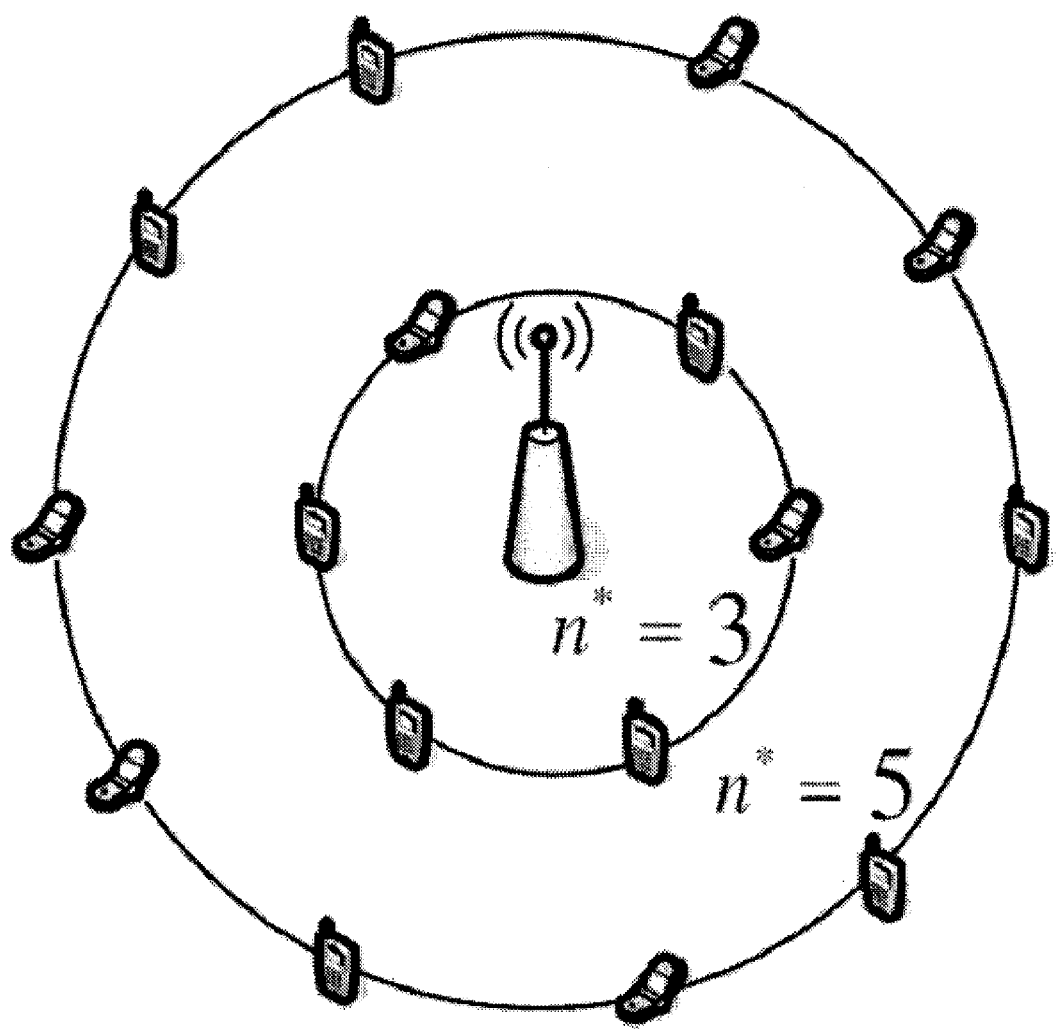
FIG. 4 illustrates one embodiment of an asymmetric network.

FIG. 4 illustrates one embodiment of an asymmetric network.

As illustrated in FIG. 4, at a first tier close to the base station, six terminals are circularly distributed. At second tier relatively far from the base station, ten terminals are circularly distributed. Considering only the distance although the wireless channel state is dependent on various parameter, the terminals of the first tier have an identical average received SNR value, $z_1$, and the terminals of the second tier have an identical average received SNR value, $z_2$ (smaller than $z_1$ if only the distance is considered). Accordingly, in the n determining method according to EPF-A, $z_0$ may be calculated by $(6 \cdot z_1 + 10 \cdot z_2)/16$.

In FIG. 4, the optimal solutions n* show 3 and 5. This implies that the optimal solution becomes 3 when the average received SNR of all 16 terminals is $z_1$ using EPF manner. The optimal solution becomes 5 when the average received SNR of all 16 terminals is $z_2$ using EPF manner.

Therefore, if the optimal solution n* according to EPF-A is 4, the transmission efficiency may be slightly deteriorated compared to the situation where the terminals of the first and the second tiers are controlled by 3 non-sleeping terminals and 5 non-sleeping terminals, respectively.

The scheduling method according to EPF-G is implemented by including the terminals similar in the average received SNR into a group and then scheduling the same in a group unit. Referring to FIG. 4, the scheduling method according to EPF-G will be described as follows. First, the scheduler includes the 6 terminals of the first tier into a first group and then includes the 10 terminals of the second tier into a second group. The scheduler determines the controlling period and the number of the non-sleeping terminals for each group (according to FIG. 4, the number of non-sleeping terminals of the first group is 3, and the number of the non-sleeping terminals of the second group is 5). Next, the scheduler alternatively selects the first group and the second group. The terminals of the selected group is scheduled in the identical manner to that of EPF during the relevant controlling period. The terminals of the unselected group operate via the sleeping terminals.

Figure 5:
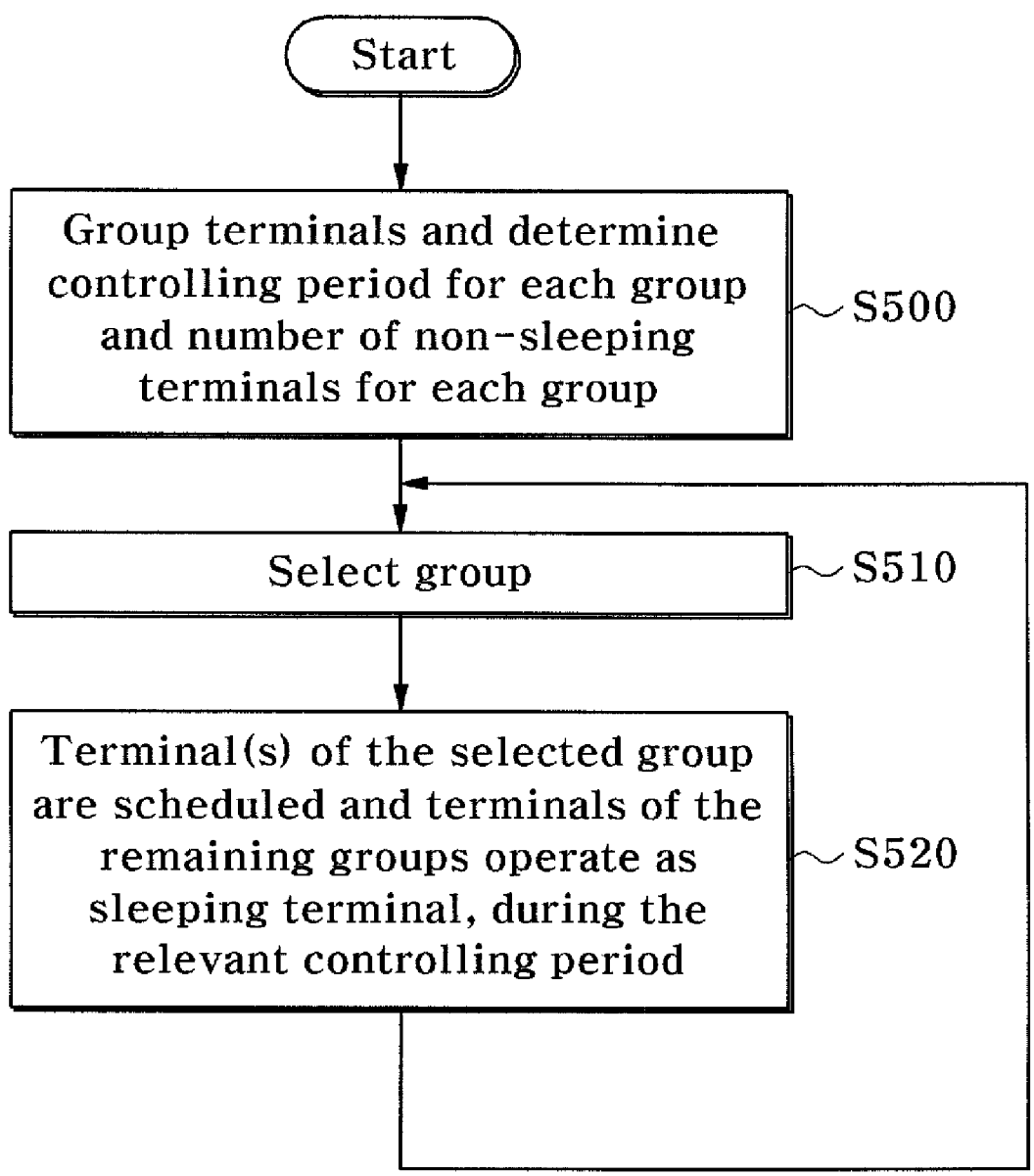
FIG. 5 is a flow chart illustrating a scheduling method in another embodiment.

FIG. 5 is a flow chart illustrating a scheduling method in another embodiment, particularly, illustrating a scheduling method according to EPF-G.

In the step of S500, the scheduler of the base station groups the terminals into the first to the $M^{th}$ group and determines the controlling period for each group and the number of non-sleeping terminals $(n_1, n_2, \ldots, n_m, \ldots, n_M)$. In one embodiment of the grouping method, the terminals similar in the channel state form an identical group. In one embodiment, the method of determining the controlling period may determine the controlling period of the number of time slots proportional to the number of group elements. In one embodiment, the method of determining the number of non-sleeping terminals may determine the number of non-sleeping terminals via EPF manner per each group. For example, the number of non-sleeping terminals of the m-th group may be determined according to EPF manner based on the number of group elements of the m-th group and the average received SNR $z_m$ of the terminals belonging to the m-th group.

In S510, the scheduler of the base station selects one group among the first to the M-th group. For example, a group-selecting method may use the round robin method in a fair manner, however, the scope of this disclosure is not limited hereto.

In S520, the terminals of the currently selected group is scheduled during the related controlling period. For example, the terminals of the currently selected group is scheduled in the same method to the aforesaid EPF scheduling as shown in FIG. 1. The terminals of the unselected group operate as the sleeping terminals.

When the related controlling period ends, the procedure returns to the step of S510 and repeats the next steps by selecting new group.

Figure 6:
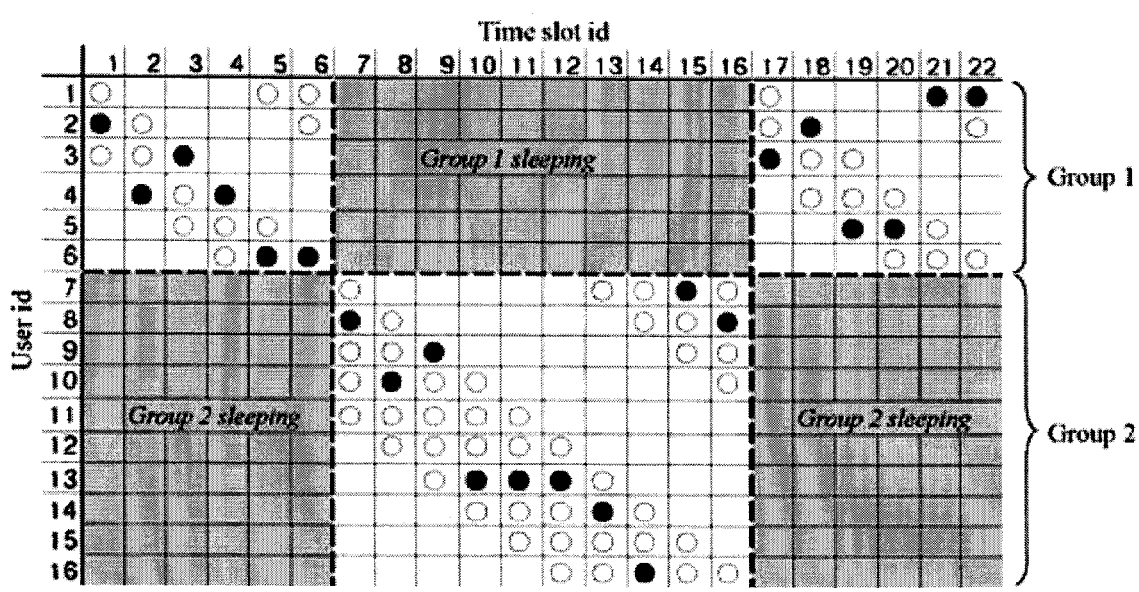
FIG. 6 is illustrated to depict one embodiment of FIG. 5.

FIG. 6 is illustrated to depict one embodiment of FIG. 5.

Each denotation on the vertical axis and the horizontal axis and the unit handling time of the scheduler in FIG. 6 may be explained in the same manner of FIG. 2. In FIG. 4, the first to the sixth terminals are included in the first group, and the seventh to the sixteenth terminals are included in the second group. The controlling period of the first group is determined by the 6 time slots while the controlling period of the second group is determined by the 10 time slots. This causes by the controlling period determined to be proportional to the number of group element.

Referring to FIG. 6, when the first group is scheduled (i.e. during the controlling period of the first group), the terminals of the first group operate in the same manner of FIG. 2 and all of the terminals of the second group are in the sleeping mode. On the contrary, when the second group is scheduled (i.e. during the controlling period of the second group), all of the terminals of the first group are in the sleeping mode and the terminals of the second group operate in the same manner of FIG. 2.

Figure 7:
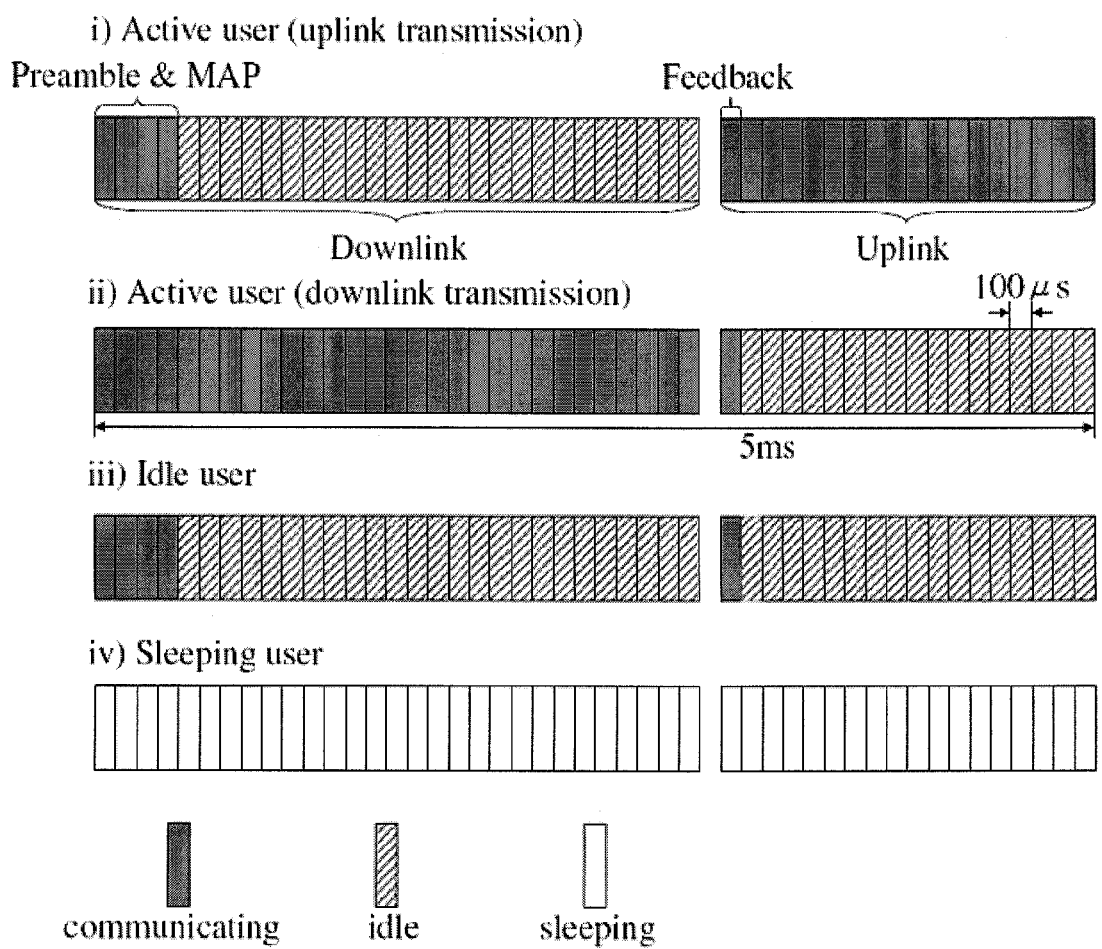
FIG. 7 is illustrated to describe the operation methods of sleeping terminal, idle terminal, and active terminal when the present disclosure is applied into a frame structure of Mobile WiMAX.

FIG. 7 is illustrated to describe the operation methods of the sleeping terminal, the idle terminal, the active terminal when the present disclosure is applied into a frame structure of Mobile WiMAX.

Referring to FIG. 7, the downlink sub-frame includes the preamble & MAP section, and the downlink bust section. The uplink sub-frame includes the transmission section of the channel state information and the uplink bust section. The sleeping terminals inactivate the transmitting and receiving function during the related frame. The non-sleeping terminals (idle terminal and active terminal) activate the receiving function during the preamble & MAP section to estimate the received SNR via the preamble and so on. The non-sleeping terminals activate the transmitting function during the transmission section of the channel state information to transmit the channel state information including the estimated received SNR. The active terminal activates the receiving function during a predetermined time period belonging to the related downlink bust when a downlink bust is determined to be forwarded to the active terminal through the MAP. When a uplink wireless resource allocated to the active terminal through MAP is detected, the active terminal may activate the transmission function during the related wireless resource and transmits the uplink bust.

FIG. 8 is a table illustrating a comparison of the functions between a scheduling technique of the present disclosure and a conventional technique in a symmetric network.

In FIG. 8, the MAX scheduling technique (hereinafter referred to as MAX) and the proportional fair scheduling technique (hereinafter referred to as PF) are on the same line. That is because the functions of MAX and PF are identical in the symmetric network where the received SNR of all terminals has the identical probability distribution.

Referring to FIG. 8, the cell throughput is high in the order of PF, EPF, and round robin scheduling technique (hereinafter referred to as RR). This is caused by the feature of RR not considering the channel state and the feature of PF having the benefits of multiuser diversity owing to the large number of candidates (i.e. terminals reporting the channel state information), which may become the active terminals.

With reference to FIG. 8, the network lifetime is high in the order to RR, EPF and PF. This is caused by the feature of PF where all the terminals should report the channel state information and the feature of RR slightly consuming energy as the channel state information is not required to be reported.

With reference to FIG. 8, the total transferred traffic is excellent in the order of EPF, RR, and PF. This is caused by the feature of the network lifetime and the aforesaid cell throughput of each scheduling technique. Particularly, EPF has the best function since the high transmission efficiency may be acquired in energy consumption.

FIGS. 9 to 12 are graphs, respectively, comparing the present scheduling technique and the conventional scheduling technique in cell throughput, network lifetime, total transferred traffic, and fairness index in an asymmetric network.

Figure 9:
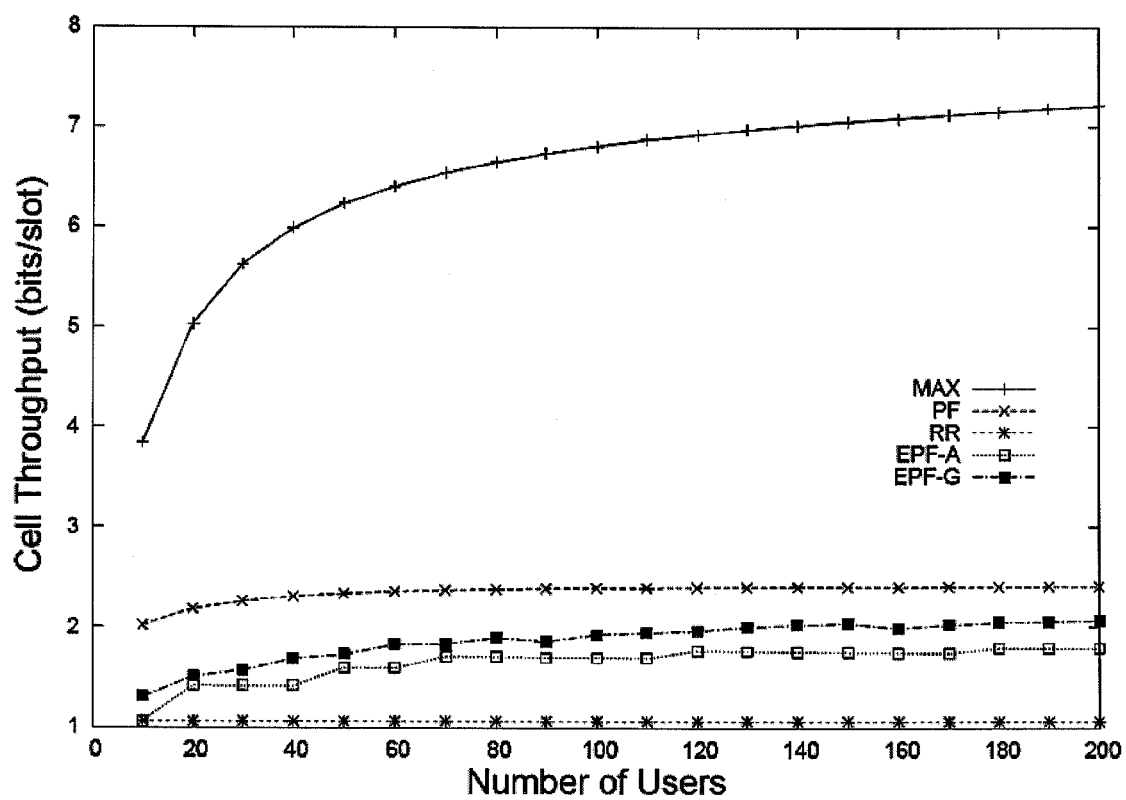
FIGS. 9 to 12 are graphs respectively comparing the present scheduling method and the conventional scheduling method in respect to cell throughput, network lifetime, total transferred traffic, and fairness index in an asymmetric network.
Figure 10:
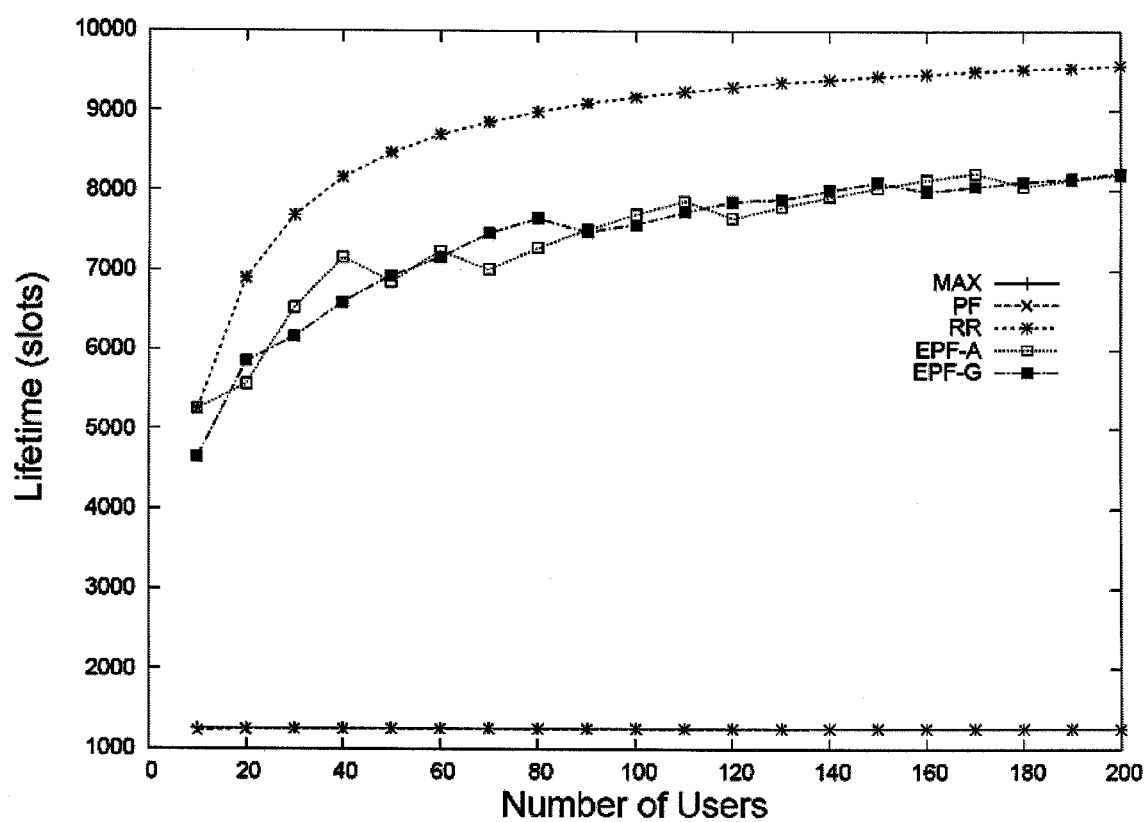
Figure 11:
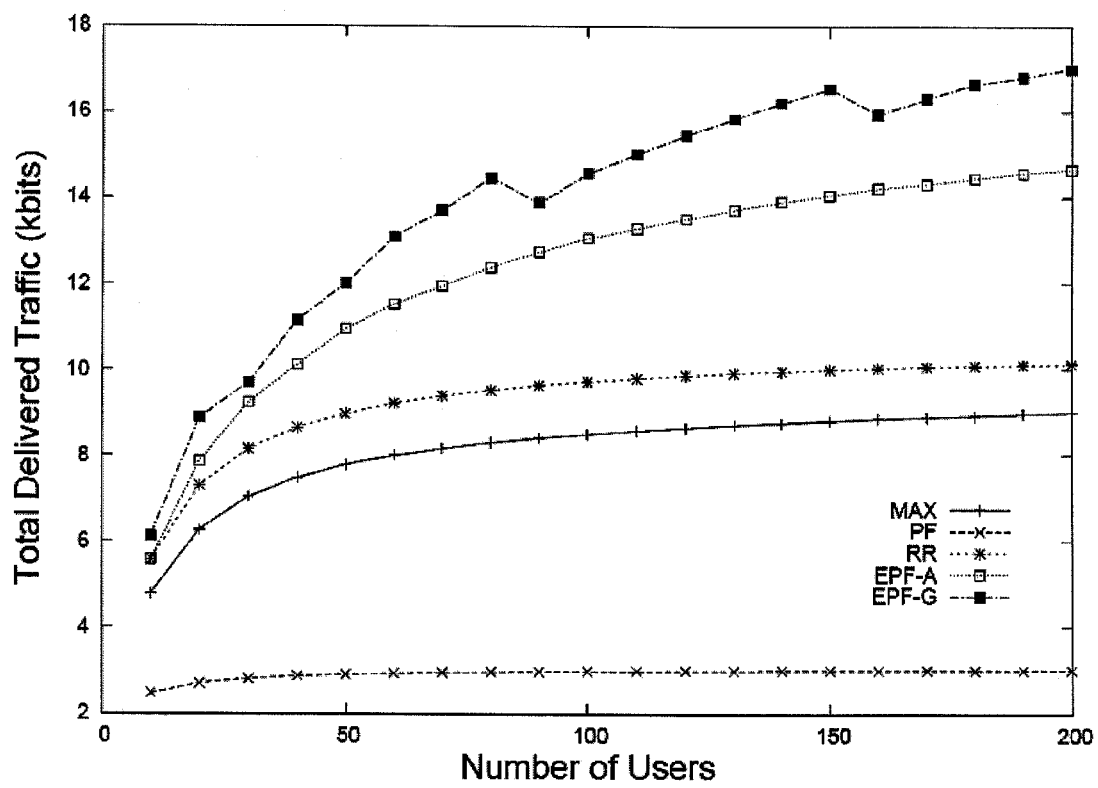

Referring to FIGS. 9 to 11, the performance characteristics functional features are depicted in the same manner of FIG. 8.

Figure 12:
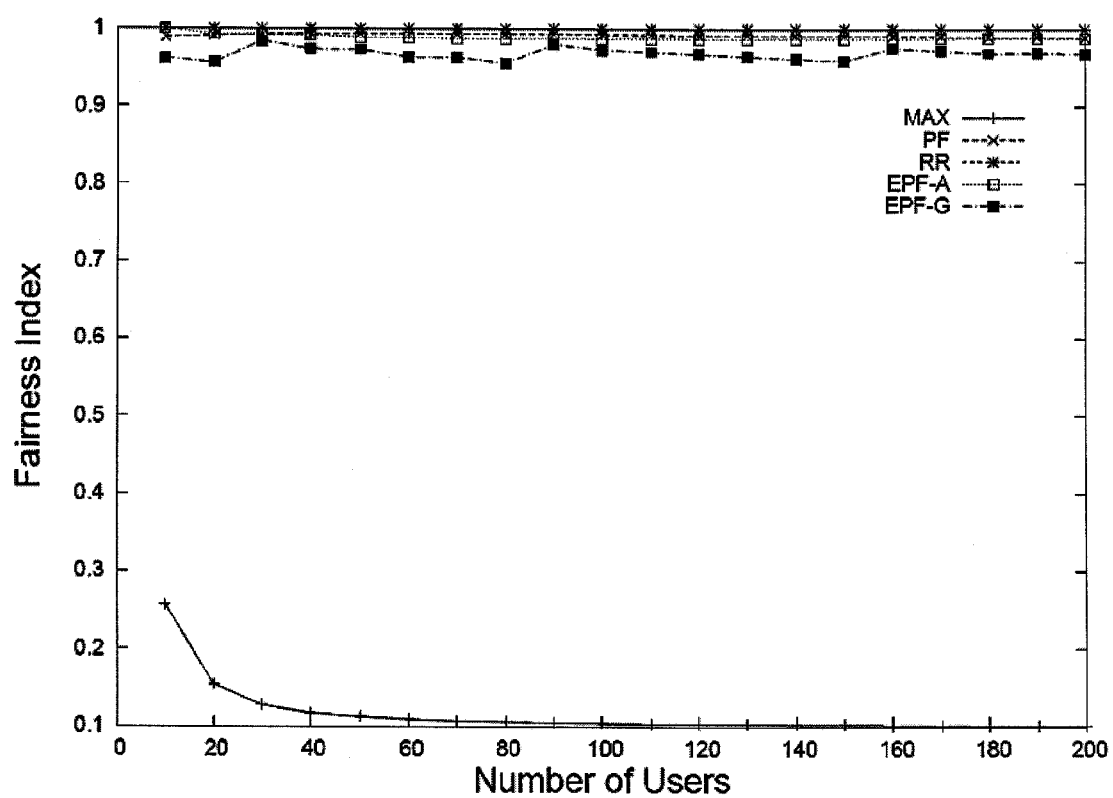

As shown in FIG. 12, the scheduling method of the present disclosure maintains a suitable level of fairness index.

The present disclosure can be implemented as computer-readable code in a computer-readable recording medium. The computer-readable recording medium is any recording medium for storing data that can be read by a computer system. Examples of the computer-readable recording medium include a read-only memory (ROM), a random access memory (RAM), a compact disk-read only memory (CD-ROM), a magnetic tape, a floppy disk, and optical data storage. Alternatively, the medium may be implemented in the form of carrier waves (e.g., Internet transmission). The computer-readable recording medium may be distributed among networked computer systems, and the computer-readable code may be stored and executed in a decentralized manner. And, functional programs, codes and code segments for implementing the present disclosure may be easily inferred by programmers skilled in the art.

The exemplary embodiments of the present disclosure have the following advantages. However, since this does not mean that all the exemplary embodiments of the present disclosure include the advantages, the scope of the present disclosure is not limited to the advantages.

As apparent from the foregoing, there is an advantage in that a wireless cellular network improved in energy efficiency with fairness is provided.

Furthermore, the present disclosure may optimize the total transferred traffic while maintaining a suitable level of operation time of the wireless devices, the network lifetime and the cell throughput.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for scheduling N terminals, wherein N is a number greater than one, at a scheduler of a wireless communication system, comprising the steps of:
   (a) selecting n terminals among the N terminals, wherein n is a number less than N;
   (b) receiving channel state information from the selected terminals and allocating wireless resources to at least one terminal among the selected terminals;
   (c) performing one of transmission and reception via the allocated wireless resource at the at least one terminal; and
   (d) newly selecting n terminals and returning to the (b) step, wherein remaining terminals not among the selected terminals inactivate the transmitting and receiving function at the steps of (b) and (c),
   wherein the n is a natural number selected to maximize the communication system efficiency in relation to energy consumed by the terminals;
   wherein the n is a natural number determined by $$\max_n \frac{r(n)}{e(n)} \text{ subject to } 1 \le n \le N,$$

wherein r(n) denotes an average efficiency of the wireless communication system and is determined according to a statistical feature of the channel state and n, and e(n) denotes a total energy consumed for the terminals to operation at the step (b) and the step (c).

2. The method of claim 1, wherein the selected terminals inactivate the transmitting and receiving function for a remainder of a time period except for a period of obtaining and transmitting the channel state information and a period corresponding to the allocating wireless resources.

3. The method as defined in claim 1, wherein the (b) step comprises allocating the wireless resource to a terminal having the highest transmission rate predicted by the mean transmission rate to the current channel state.

4. The method as defined in claim 1, wherein the channel state information comprises a received signal-to-noise ratio.

5. The method as defined in claim 1, wherein the (d) step comprises newly selecting n terminals at least partially different from the previously selected n terminals and then returning to the (b) step.

6. The method as defined in claim 5, wherein the (d) step comprises the step of newly selecting the n terminals via a round robin technique.

7. The method as defined in claim 1, wherein the scheduler is placed at a base station belonging to the wireless communication system.

* * * * *